Figure 1:
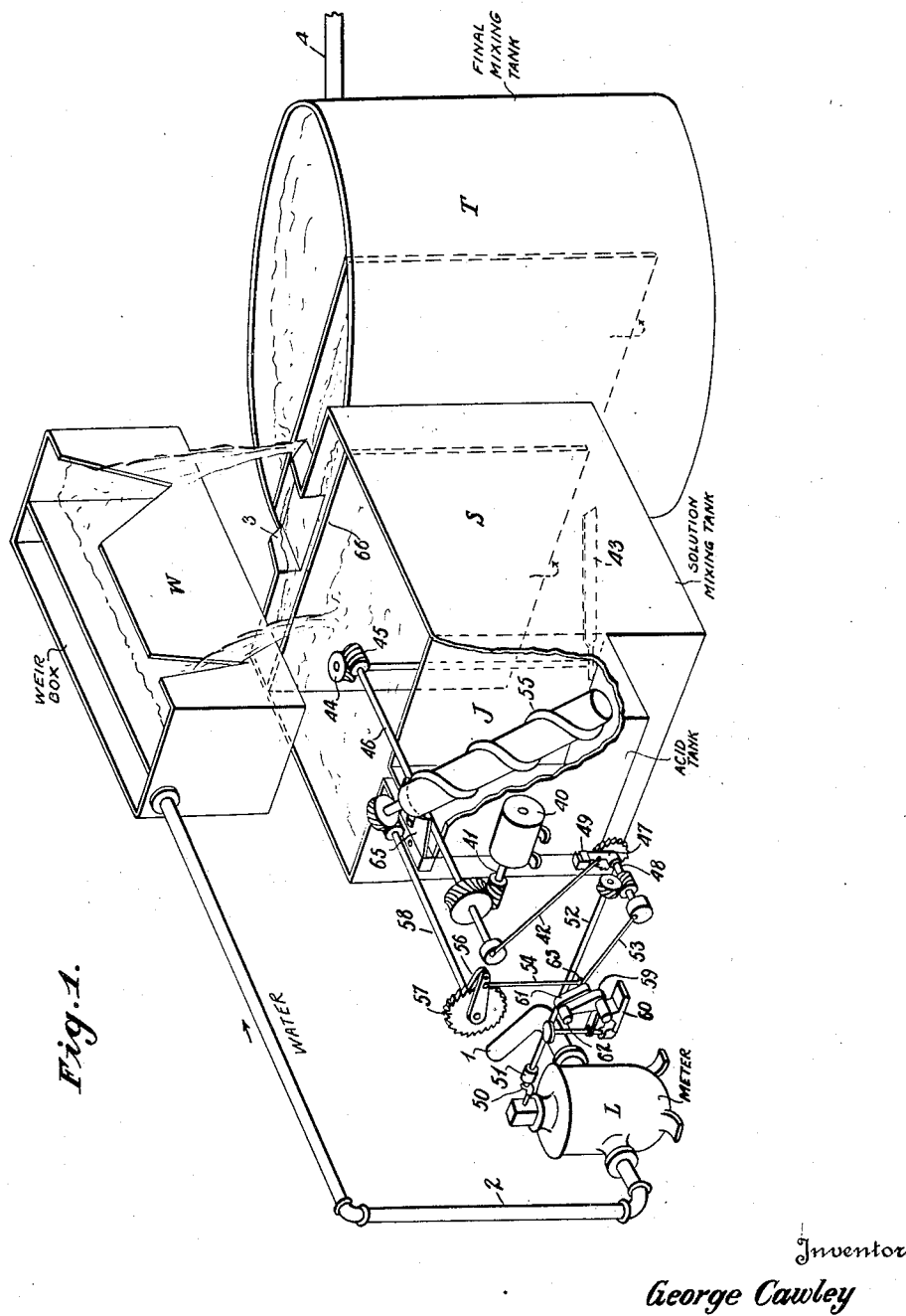

July 31, 1928.  1,678,766
G. CAWLEY
PROCESS OF AND APPARATUS FOR TREATING WATER
Filed Dec. 7, 1926  2 Sheets-Sheet 1

Inventor
George Cawley
By K. O. McElroy
his Attorney

July 31, 1928.  
G. CAWLEY  
1,678,766  
PROCESS OF AND APPARATUS FOR TREATING WATER  
Filed Dec. 7, 1926   2 Sheets-Sheet 2
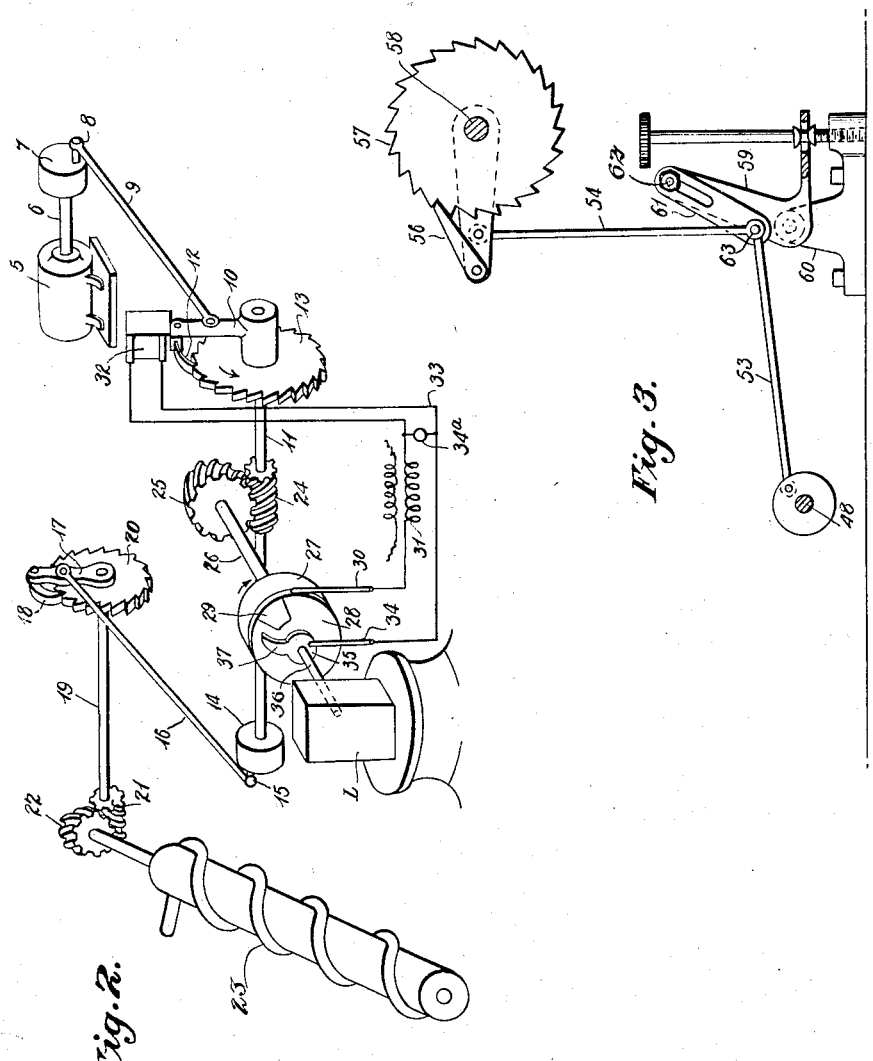
Inventor  
George Cawley  
By  
his Attorney Patented July 31, 1928.

1,678,766

UNITED STATES PATENT OFFICE.

GEORGE CAWLEY, OF MONTCLAIR, NEW JERSEY, ASSIGNOR TO THE PERMUTIT COMPANY, OF NEW YORK, N. Y., A CORPORATION OF DELAWARE.

PROCESS OF AND APPARATUS FOR TREATING WATER.

Application filed December 7, 1926. Serial No. 153,147.

This invention relates to processes of and apparatus for treating water; and it comprises a process wherein a flow of water, and particularly of water containing small amounts of alkaline material, such as hydroxids, or carbonates and bicarbonates, is treated with measured additions of a suitable acid, such as sulfuric acid, said treatment being of a portion of said flow diverted for that purpose; and it further comprises an apparatus particularly suitable for feeding small quantities of acid to water, whereby the amount of acid fed is automatically proportioned to the amount of water flowing through the apparatus; all as more fully hereinafter set forth and as claimed.

There are many cases where it is desirable to treat water with small amounts of acid for one purpose or another, as in converting various dissolved carbonates into sulfates or chlorids; for example, water coming from a "soda lime" purifying process. This water sometimes carries a little soda which it is desirable to convert into sulfate. There are certain natural waters, and particularly in the West, where there is a certain amount of alkali present, which also can advantageously be treated with acid. In all cases, the actual amount of acid to be added to the water is quite small, while extreme accuracy in addition is necessary. Any excess of acid is detrimental, while an insufficient quantity of acid does not do what is wanted. Accuracy of addition can be attained by diluting commercial strong acids and adding the measured volumes of extremely weak acid to the water; but this is not only inconvenient and expensive, but requires special corrosion-resisting apparatus, usually of large size. It is the purpose of the present invention to provide a process of and apparatus for adding acid to water with the necessary accuracy, while at the same time using commercial acids, such as sulfuric acid and hydrochloric acid, in convenient apparatus.

While the present invention is applicable in any situation where accurate additions of small amounts of strong acids to water are required, yet I shall hereinafter describe it more particularly as applied to certain types of industrial water containing extremely small quantities of sodium compounds.

In softening water by base exchange, that is, by passing it through a pervious granular bed of zeolitic material, such as green sand or artificial zeolites, the softened water contains appreciable amounts of sodium compounds and is often or usually slightly alkaline. While the quantity of actual alkali present is always extremely low, being, say, not more than a few hundred parts per million, yet even this quantity under certain conditions may be regarded as undesirable. In boiler work, for example, there is sometimes a desire to have neutral salines of the type of sodium salts of strong acids, such as sodium sulfate, present rather than alkaline reacting salines, such as sodium carbonate. Justifiably or unjustifiably, as the case may be, there is a feeling in some quarters that water having any alkaline reaction may have an injurious effect on strained metal in the vicinity of rivets. Whether or not any such effect exists, and if it exists, it is due to the presence of traces of caustic soda or of other alkali in the water, is a debatable question. It is desirable however, irrespective of this effect, if it exists, that water for certain uses shall contain no soluble alkali material.

The many devices described in the prior art for feeding chemicals to water for one purpose or another, may be roughly classified into types wherein a gravity feed is employed, for instance, siphon control apparatus, and metering devices wherein a flowing current of liquid is caused to actuate a meter and the meter, in mechanical connection with a feeding device, feeds a treating liquid to the flowing water.

Both of these types have certain inherent objectionable characteristics for the present purposes. In the gravity flow type, either no provision is made for stopping when the flow of water ceases or, where a double siphon arrangement is used, there is often a possibility of the siphons becoming clogged by foreign matter. Either would be fatal for the present purposes. In the metering type of apparatus, the feeding of the treating liquid depends upon a continuous flow of water through the meter and a mechanical load is imposed upon the meter. No accurate meter can be made which will, at the same time, mechanically actuate a feeding device.

It is an object of the present invention to provide an apparatus which is particularly adapted for feeding small amounts of sulfuric acid (or hydrochloric acid) at regulated intervals to a flowing body of water, and in which there is no mechanical connection between the metering device, which measures the quantity of water flowing through the system, and the feeding device, which supplies acid to the water. In so doing, the energy used in actuating the feeding device is not a load on the meter. The present apparatus is, further, so designed that upon any cessation of flow of water through the meter, an immediate stoppage of the feeding device occurs, precluding the possibility of an excessive addition of acid to the water. Acid water is precluded.

In its broadest aspect, my invention comprehends a metering device electrically linked to a feeding device whereby a flow of water through the meter establishes, through contact means connected to the indicating shaft of the water meter and to the acid feeding mechanism, an electric current which permits actuation of the acid feeding mechanism only when energized. Upon the establishment of an electric current, a pump is actuated whereby definite quantities of acid solution are pumped into a mixing tank into which a minor part of the water flowing through the meter is passed.

In the accompanying drawings is illustrated an advantageous embodiment of my invention, but I do not wish to be restricted thereto, for it is obvious that equivalents may be substituted for the parts shown therein. In the illustration, Figure 1 represents a schematic diagram of the position of the apparatus;

Figure 2 is a similar view of a feeding mechanism, together with the electrical system for operating it; and Figure 3 is a similar detail view of the linkage mechanism for varying the rotation of an acid pump.

Referring first more particularly to Fig. 1, of the drawing, water, which may contain a small quantity of alkali, say, 60 parts per million, enters a meter L by pipe 1 and passes therefrom through pipe 2 to a weir box W. The weir box overlies two tanks S and T and is provided with openings for permitting the water to be treated to flow therefrom into the respective tanks in predetermined relative quantities. The tank S is a preliminary mixing tank in which the water and acid, say, 66° Bé. sulfuric acid, from tank J are mixed by stirring means to be hereinafter described. From tank S the acid-treated water, now containing a slight excess of acid, is passed through a trough 3 and into the final mixing tank T, where it is further mixed with the remainder of the water flowing from the weir box and, after passing over and around the baffles which are completing intermixture of the acid and water, passes through outlet 4 to a point of use.

The acid feeding and feed regulating mechanism is shown in detail in Fig. 2 of the drawing, and it comprises a continuously running electric motor 5, the armature shaft 6 of which terminates in disc 7 having crank pin 8 eccentrically mounted thereon. Crank rod 9 connects the eccentrically mounted pin with pawl-supporting arm 10, loosely mounted on shaft 11 and having pawl 12 pivoted thereto adjacent its upper end. Ratchet wheel 13, fixedly mounted on shaft 11, is provided for rotating such shaft by the action of pawl 12. Shaft 11 terminates in disc 14 with an eccentrically mounted crank pin 15 thereon, which carries crank rod 16 connected at its other end to arm 17 of pawl 18, such arm being loosely mounted on shaft 19. Pawl 18 engages the teeth of ratchet 20 to rotate shaft 19. At its other end shaft 19 has a spiral gear 21 meshing with a similar gear 22 to rotate the spiral pump 23.

Continued intermittent rotation of the pump through the mechanism described above would result in the feeding of a fixed quantity of acid into the mixing tank S without regard to the amount of water which is flowing through the system. Thus, if the flow of water should decrease, the acid content of the water flowing from the apparatus would be increased to an extent which might render it unfit for the use intended. It is therefore necessary to proportion the amount of acid delivered to the mixing tank to the amount of water flowing into the system and to its alkalinity so that a proper mixture of acid with the water shall be effected at all times, regardless of variations in the flow of the water. To accomplish this end, a worm 24 is provided on shaft 11, meshing with worm wheel 25 on shaft 26. Shaft 26 carries disc 27 of electrically conductive material having an insulated face 28; or the disc may be made of insulating material with a conducting ring mounted thereon. Insulating face 28 has mounted therein, or thereon, a conducting segment 29 in electrical connection with the conducting disc 27 or a conducting ring. Brush 30 bears against disc 27 and has electrical connection with the secondary 31 of a transformer or other source of low voltage electric power. From the other end of the secondary winding, a conductor extends to the coils of an electromagnet 32, mounted on the end of arm 10 and movable therewith. Another conductor 33 leads from the electromagnet back to a second brush 34. Electric lamp 34ª may be shunted across brushes 30 and 34, as shown, to serve as a signal and, by its flickering, indicate whether or not the apparatus is working properly. Brush 34 contacts with conducting disc 35 mounted on the end of shaft 36 of water meter L of usual construction, such disc being provided with projecting finger 37 which, upon rotation of disc 35 relative to disc 27, is adapted to contact with conducting segment 29 and establish an electric circuit to energize the electromagnet 32. Pawl 12 is pivoted to arm 10 intermediate its ends, one of its ends being formed as a ratchet engaging means and its other end engaging the armature of the electromagnet 32 which is mounted on the end of arm 10.

In operation, rotation of the armature shaft 6 of electric motor 5 causes oscillation of arm 10 about shaft 11. Assuming that at this time the finger 37 is not in contact with the conducting segment 29 and that the electromagnet is consequently de-energized, the pawl 12 will be held in a position above the teeth of the ratchet 13 and will not engage them to rotate the ratchet and the shaft 11 to which it is affixed. At the same time, water flowing through the meter L in its passage to the weir box rotates the shaft 36 and disc 35 in a clockwise direction, as seen in Fig. 2 of the drawing. Since, at this time the disc 27 is not rotating, the finger 37 will approach and contact with the conducting segment 29, thus energizing the electromagnet 32. Pawl 12 thereupon drops and engages the teeth of ratchet 13, imparting a step-by-step movement to it and to the shaft 11 upon which it is mounted. Rotation of the shaft 11 actuates crank rod 16 and pawl 18 to move ratchet 20, such movement being transmitted through shaft 19 and gears 21 and 22 to the helical pump 23. At the same time, rotation of the worm 24 on shaft 11 rotates gear 25, shaft 26 and disc 27 in a clockwise direction, as seen in Fig. 2 of the drawing. Rotation of the disc 27 is more rapid than that of the disc 35, thus moving the conducting segment 29 ahead of the finger 37 and out of contact therewith, both finger 37 and disc 27 being movable in the same direction. The electric circuit in which the magnet 32 is interposed is thus broken and pawl 12 is raised to prevent its engagement with the teeth of ratchet 13. Further rotation of the disc 27 and also of the spiral pump 23 is stopped until such time as finger 37, actuated by the flow of water through meter L, again establishes electrical connection with conducting segment 29. It will thus be apparent that, although no load is imposed upon the delicate mechanism of the water meter, the delivery of acid to water is dependent directly upon the amount of water which is flowing through the meter and, consequently, it is impossible to deliver an excess of acid to the water.

The arrangement shown in Fig. 1 is generally similar to that above described, but in the showing of that figure a means is provided for varying the throw of the pump operating connecting rod and, consequently, the rotation of the pump. The mechanism comprises a continuously running electric motor 40 which transmits rotary motion to shaft 41 and operates crank 42 continuously, at the same time actuating agitator 43 in tank S through gears 44 and 45 and shaft 46. Arm 47, loosely mounted on shaft 48, carries a pawl (not shown) and an electromagnet at its upper end. When an electric circuit is established through the electromagnet by contact of the arm 50 of water meter L, with the conducting segment (not shown) on disc 51, shaft 48 will be rotated and will thereby impart rotation to shaft 52 to turn disc 51 until the conducting segment is moved ahead of the arm 50 of the water meter. Rotation of shaft 48 actuates connecting rod 53 which is connected to a linkage mechanism for permitting variation of the throw of rod 54 and, consequently, the rotation of helical pump 55, for as in normal operation the throw of rod 54 is such that pawl 56 rides over, say, five teeth of the ratchet 57 each time the rod 54 is reciprocated, the throw of the crank can be increased so that pawl 56 will ride over eight teeth, or decreased so that it will ride over only two or three teeth of the ratchet, as desired. Thus, the amount of rotary movement which is imparted to shaft 58 upon each reciprocation of rod 54 can be varied at will.

The linkage, which is shown in detail in Fig. 3, comprises a link 59 pivoted at its lower end to support 60 and at its upper end to a second link 61, as at 62, the lower end of link 61 being pivotally connected at 63 with the connecting rods 53 and 54. Any suitable means is provided for holding link 59 in any predetermined position, for example, by the projecting prongs and coacting set screw, as shown in the drawing. If it is desired to alter the throw of rod 54, link 59 is moved forwardly and backwardly about its pivot, thus moving the pivot 62 forwardly or backwardly. Such movement shifts the center about which link 61 swings when actuated by connecting rod 53. When the pivots of the links are in line with connecting rod 54, it will be understood that vertical movement of the connecting rod 54 will be at a minimum, since in a swing through an arc of fixed length determined by the movement of rod 53, rod 54 will rise and fall but a slight distance. When, however, link 59 is moved forward or backward about its pivot in the support, pivot 62, being the center about which link 61 swings, is moved so that although the arc through which pivot 63 moves is of the same length as before, the path of movement of the pivot is changed so that, for the same movement of rod 53, a greater vertical movement is imparted to rod 54.

In the operation of the device, water to be treated enters meter L by pipe 1, and thence flows into weir box W by pipe 2. A minor portion of the water passes from the weir box into the solution mixing tank S and a major portion passes into the final mixing tank T, all of the water leaving the latter by pipe 4.

The passage of the water through the meter actuates the acid feeding device as described, so that the helical pump is made to deliver a regulated portion of strong acid to the mixing tank S, entering the same by means of trough 65. The agitator in S insures rapid mixing. More than enough acid necessary to neutralize the alkali is delivered to the water in tank S, so that the treated water leaving S, by passing underneath baffle 66 and over trough 3 into tank T, is slightly acid. The amount of acid, however, is so regulated that there is not more than just enough excess to neutralize the alkaline material in the major portion of water delivered to T by the weir box.

It is better to have the water leave tank T in a very slightly alkaline condition rather than have any excess of acid present. Acid water must be avoided.

Upon cessation of a water feed to the meter, immediate cessation of operation of the acid feeding device occurs, so that the apparatus fulfills this requirement. Furthermore, there are no siphons to clog.

What I claim is:—

1. The process of adding accurately proportioned amounts of acid to water which comprises measuring a continuously flowing body of water, dividing the flow into a major portion and a minor portion, adding to and mixing with the minor portion a regulated amount of acid proportionate to the flow of water, and then uniting the acid-treated minor portion with the major portion of the water.

2. The process of treating slightly alkaline water which comprises measuring a continuously flowing body of water, dividing the flow into a major portion and a minor portion, adding to and mixing with the minor portion a regulated amount of neutralizing acid proportionate to the flow of water, said quantity of acid being not greater than that necessary to neutralize the total alkalinity in the combined major and minor portions, and then uniting the acid-treated minor portion with the major portion of the water.

3. In apparatus for the treatment of water, a pump for delivering treating liquid to the water, pawl and ratchet means for operating said pump, an electric motor adapted to reciprocate said pawl and thereby operate said pump, an electromagnet cooperating with said pawl and adapted to retain it in position away from the teeth of the ratchet when said magnet is de-energized, a contact arm actuated by the flow of water into the apparatus, a cooperating contact actuated by movement of said ratchet, an electric circuit closed by abutment of said contacts to thereby energize said electromagnet whereby said electric motor is caused to operate said ratchet and pump, movement of said ratchet causing subsequent separation of the said contacts and discontinuance of the pumping operation until the flow of water actuating one of the contacts again establishes electrical communication therebetween, energizing the electromagnet, engaging the pawl with the teeth of the ratchet and repeating the cycle of operation.

4. The process of adding accurately proportioned amounts of acid to alkaline water which comprises measuring the flow of such water to ascertain the amount of alkali to be neutralized in a given volume thereof, intermittently feeding at predetermined periods of time and at a constant rate a known quantity of acid to the water, effecting said feeding only while said water is flowing, and varying the time length of said feeding with variations in the rate of flow of said water.

5. Apparatus for adding a treating chemical to water comprising a flow meter provided with a movable member adapted to be actuated at a rate dependent upon the rate of flow of the water, a pump for feeding chemical to the water, a source of motive power adapted to actuate the pump at a constant rate whereby a known quantity of chemical will be added during equal periods of operation, means to connect the source of motive power to the pump to effect the actuation thereof, electrical means connected to the movable member on said water meter adapted to close intermittently an electrical circuit to actuate said connecting means, thereby operating the pump, and means actuated by the closure of said electrical circuit to open intermittently the electrical circuit passing through the movable member.

6. Apparatus for adding a treating chemical to water comprising a water meter provided with an element movable at a rate dependent on the rate of flow of the water, an electrical contact member mounted on said element, a second movable contact member, an electrical circuit adapted to be closed by contact of said contact members, means for supplying chemical to the water at a predetermined rate, said means being actuated to effect such supply upon contact of the electrical members, and means operative upon movement of the chemical to move the second contact member to open the electrical circuit and thereby stop the supply of the chemical.

7. Apparatus for adding a treating chemical to water comprising a water meter provided with a rotatable element, a chemical supplying pump, a motor to operate the pump at a fixed rate, a mechanical train including a pawl and ratchet extending from the motor to the pump, electrical means affixed to the rotatable element to effect the engagement of the pawl with the ratchet and thereby effect the operation of the pump, and means movable upon operation of the pump to open the electrical circuit and thereby cause the disengagement of the pawl and ratchet and stop the operation of the pump.

8. Apparatus for adding a treating chemical to water comprising a water meter provided with a rotatable element, a chemical supplying pump, a motor adapted to operate said pump at a fixed rate, a mechanical train including a pawl and ratchet extending from the motor to the pump, adjustable means mechanically connected to the pawl to alter the throw thereof, electrical means affixed to the rotatable element adapted to contact with additional electrical means upon rotation of the element thereby closing an electrical circuit to actuate the pawl and ratchet and operate the pump, and means interposed in the mechanical train for opening the electrical circuit operable upon movement of the mechanical train.

9. Apparatus for adding a treating chemical to water comprising a water meter provided with a member movable at a rate dependent on the rate of flow of the water, a motor, a chemical supplying pump, disengageable connecting means extending from said motor to said pump for operating said pump at a fixed rate, and a make-and-break electrical connection attached to the movable member on the water meter for intermittently operating said disengageable connection means, and means dependent on the rate of flow of the water for determining the time periods of operation of the make-and-break electrical connection.

In testimony whereof, I have hereunto affixed my signature.

GEORGE CAWLEY.